US 6,538,827 B2

(12) United States Patent
Bos

(10) Patent No.: US 6,538,827 B2
(45) Date of Patent: Mar. 25, 2003

(54) NON-CIRCULAR APERTURE STOP

(75) Inventor: Brent J. Bos, Tucson, AZ (US)

(73) Assignee: Donnelly Corporation, Holland, MI (US)

( * ) Notice: Subject to any disclaimer, the term of this patent is extended or adjusted under 35 U.S.C. 154(b) by 37 days.

(21) Appl. No.: 09/799,993

(22) Filed: Mar. 6, 2001

(65) Prior Publication Data

US 2003/0021041 A1 Jan. 30, 2003

Related U.S. Application Data

(60) Provisional application No. 60/187,961, filed on Mar. 9, 2000.

(51) Int. Cl.[7] .............................. G02B 9/08; H04N 9/47
(52) U.S. Cl. ...................... 359/740; 359/739; 359/738; 348/148; 348/117
(58) Field of Search ................... 359/740, 739, 359/738; 348/148, 149, 117, 118, 113, 114, 115

(56) References Cited

U.S. PATENT DOCUMENTS

| 4,968,124 | A | * | 11/1990 | Deckert et al. | ............. 359/435 |
|---|---|---|---|---|---|
| 5,550,677 | A | | 8/1996 | Schofield et al. | ............. 359/604 |
| 5,670,935 | A | | 9/1997 | Schofield et al. | ............. 340/461 |
| 5,796,094 | A | | 8/1998 | Schofield et al. | ........ 250/208.1 |
| 6,046,766 | A | * | 4/2000 | Sakata | .................... 348/148 |
| 6,201,642 | B1 | * | 3/2001 | Bos | ........................... 359/565 |
| 6,357,883 | B1 | * | 3/2002 | Strumolo et al. | ............ 359/857 |
| 2002/0048086 | A1 | * | 4/2002 | Bos | ........................... 359/566 |

* cited by examiner

Primary Examiner—Georgia Epps
Assistant Examiner—Tim Thompson
(74) Attorney, Agent, or Firm—Van Dyke, Gardner, Linn & Burkhart, LLP

(57) ABSTRACT

A vision system for a vehicle includes an image capture device, a non-circular aperture stop and a display system. The image capture device is adapted to receive an image of a scene occurring exteriorly of the vehicle. The non-circular aperture stop defines a non-circular aperture and is positioned along an optical path between the scene and said image capture device. The display is operable to display an image from an output of said image capture device. The shape of the non-circular aperture is selected to enhance image sharpness along at least one axis of the image being received by the image capture device, while allowing sufficient light entry into the system for effective nighttime driving conditions.

46 Claims, 3 Drawing Sheets

FIG. 5A
FIG. 6A
FIG. 5B
FIG. 6B
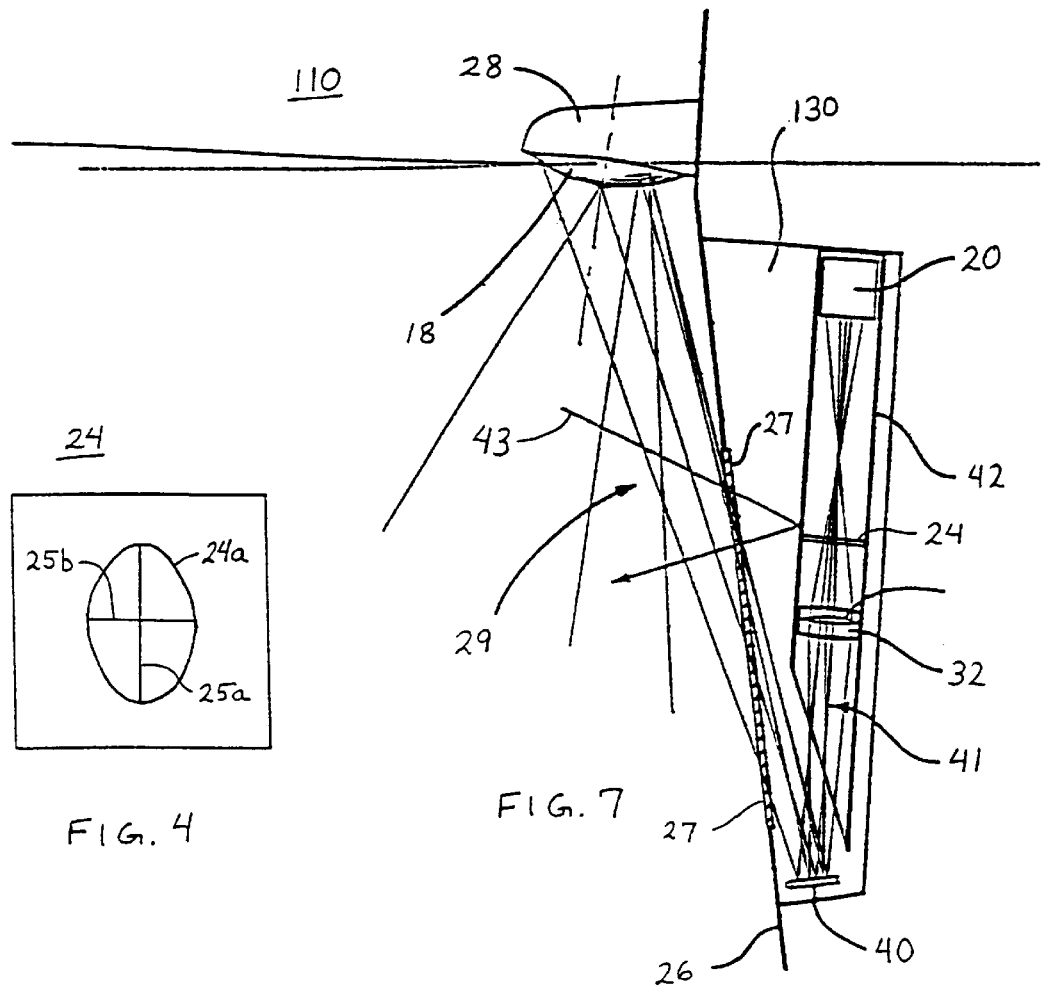
FIG. 4
FIG. 7

NON-CIRCULAR APERTURE STOP

CROSS REFERENCE TO RELATED APPLICATION

The present application claims priority from U.S. Provisional Pat. Application, Ser. No. 60/187,961, filed Mar. 9, 2000 by Brent J. Bos, which is hereby incorporated herein by reference in its entirety.

FIELD OF THE INVENTION

The present invention relates generally to vehicular vision systems and, more particularly, to a non-circular aperture stop for a reflective or transmissive vision system which reflects or refracts a non-rotationally symmetrical image toward an image capture device, such as a camera or the like. The non-circular aperture stop enhances image sharpness of the image received by the image capture device, while allowing a sufficient amount of light in to the system for effective low light or nighttime conditions.

BACKGROUND OF THE INVENTION

Typically, a vision system for a vehicle receives an image of a scene occurring exteriorly of the vehicle at a camera and displays the image at a display within the vehicle. In order to control the amount of light being received by the camera, an aperture stop is typically provided along an optical path between the scene and the camera. Historically, optical system aperture stops have been circular due to the rotational symmetry of most optical systems and their ease of fabrication. The amount of light that enters the optical system is then controlled by the transmittance of the materials, the reflectance of the materials and the diameter of the system's aperture stop. The camera may be a light sensitive, silicon detector array or the like. Because the current signal to noise ratios in commercial detectors limit their effectiveness in nighttime driving scenarios, it is desired to provide as much light as possible to the camera. The circular aperture stop diameter is selected to maximize the light passing through the aperture to the camera, in order to provide effective image reception in nighttime driving conditions.

Because many vehicular vision systems attempt to provide a wide-angle view of the scene exteriorly of the vehicle, the image received by the camera may be distorted. Some of the distortion and other aberrations may be corrected by reducing the diameter of the circular aperture stop. However, although a smaller diameter enhances image sharpness, it also further limits the amount of light being received by the system, and thus detracts from the system's effectiveness in low light conditions.

Therefore, there is a need in the art for a vehicular vision system which provides a wide-angle image of a scene occurring exteriorly of the vehicle and which functions to enhance image sharpness of the image being received by the camera, while still providing effective nighttime operation of the system.

SUMMARY OF THE INVENTION

The present invention is intended to provide a vehicular vision system which provides a compact wide-angle imaging system which is operable to provide enhanced image sharpness of the image received by the system. A non-circular aperture stop is implemented to enhance image sharpness while maintaining the light throughput for nighttime effectiveness of the system. The present invention is especially applicable to vehicular vision systems which include a non-rotationally symmetrical reflective element which reflects a non-rotationally symmetrical image toward an image capture device of the system.

According to one aspect of the present invention, a vision system for a vehicle includes an image capture device adapted to receive an image of a scene occurring exteriorly of the vehicle, a non-circular aperture stop positioned along an optical path between the scene and the image capture device, and a display system which displays an image from an output of the image capture device. The non-circular aperture stop defines a non-circular aperture, through which the reflected image passes. The vision system may further include a reflective element which may reflect a non-rotationally symmetrical image toward the image capture device. The non-circular aperture may be an elliptical aperture or other shaped aperture, depending on the particular application. The vision system may also further include a correcting optic which is positionable along an optical path between the scene and the image capture device and which may include a diffractive element and/or refractive element.

According to another aspect of the present invention, a vision system for a vehicle includes an image capture device, a reflective element, a non-circular aperture stop, and a display system. The reflective element is positionable on a portion of the vehicle and reflects a non-rotationally symmetrical image of a scene occurring exteriorly of the vehicle. The image capture device is adapted to receive the reflected image of the scene occurring exteriorly of the vehicle. The non-circular aperture stop is positioned along an optical path between the reflective element and the image capture device. The non-circular aperture stop defines a non-circular aperture through which the non-rotationally symmetrical reflected image passes. The display system is operable to display an image from an output of the image capture device.

In one form, the non-circular aperture stop comprises an elliptical aperture stop defining an elliptical opening or aperture having a first axis and a second axis with the first axis being larger than the second axis. Additionally, the non-rotationally symmetrical reflective element may have a first radius of curvature and a second radius of curvature, whereby the first radius of curvature is greater than the second radius of curvature. The aperture stop and reflective element are positioned such that the first axis of the elliptical aperture is generally aligned with a first plane defined by the first radius of curvature, while the second axis of the elliptical aperture is generally aligned with a second plane defined by the second radius of curvature, thereby enhancing image sharpness along the second axis of the elliptical aperture.

In another form, the non-circular aperture stop may comprise a non-circular and non-elliptical aperture stop, which defines a non-circular and non-elliptical opening in accordance to an equation derived to optimize the effects of the non-circular and non-elliptical aperture on the image reflected by various non-rotationally symmetrical reflectors. The shape and overall area of the aperture are selected in response to the aberrations and astigmatism of the image being reflected through the aperture stop toward the image capture device. Other shapes of non-circular aperture stops may be selected depending on the shape or curvature of the reflective element.

Therefore, the present invention provides a compact wide-angle vehicular vision system which provides enhanced image sharpness via the non-circular aperture stop. The shape, axes and/or area of the non-circular aperture stop are selected to provide optimal image sharpness, while still allowing a desired amount of light through the aperture to facilitate effective nighttime operation of the vision system.

These and other objects, advantages, purposes and features of the present invention will become apparent upon review of the following specification in conjunction with the drawings.

BRIEF DESCRIPTION OF THE DRAWINGS

FIG. 4 is a front elevation of an elliptical aperture stop in accordance with the present invention;

FIGS. 5A and 5B depict image spots of an image received through a circular aperture and a non-circular aperture, respectively, for the vision system of FIG. 2;

FIGS. 6A and 6B depict image spots of an image received through a circular aperture and a non-circular and non-elliptical aperture, respectively, for a vision system with a reflector having a surface defined by polynomial terms; and FIG. 7 is a partial sectional view similar to FIG. 2 of an alternate embodiment of a vision system in accordance with the present invention.

DESCRIPTION OF THE PREFERRED EMBODIMENTS

Figure 1:
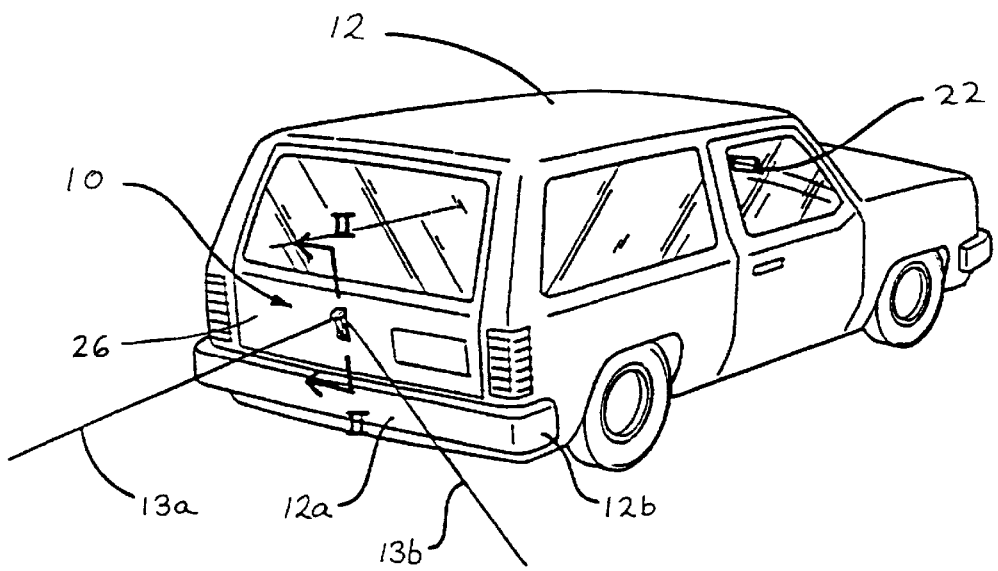
FIG. 1 is a rear perspective view of a vehicle incorporating a vehicle vision system in accordance with the present invention.
Figure 2:
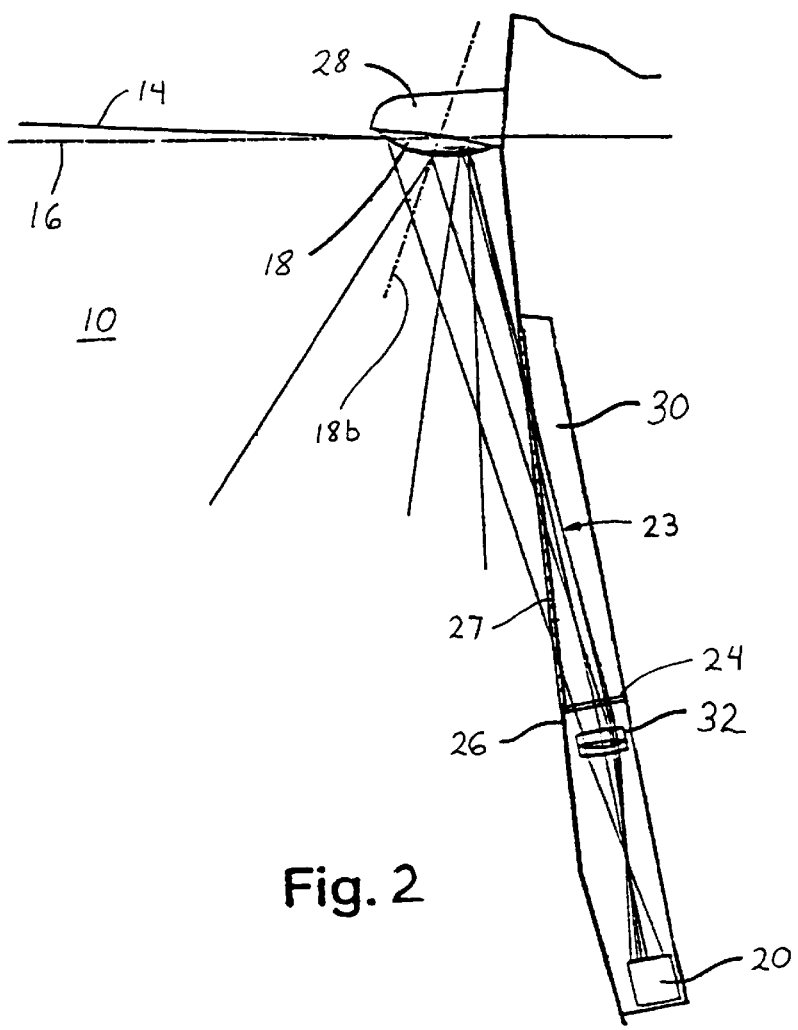
FIG. 2 is a partial sectional view of the vision system of FIG. 1 taken generally along the line II-II in FIG. 1.

Referring now to the drawings and the illustrative embodiments depicted therein, a vehicle vision system, generally illustrated at 10, is operable to provide an operator of a vehicle 12 with scenic information of an area immediately exteriorly of vehicle 12, which may be an automobile, light truck, van, large truck, sport utility vehicle, or the like (FIG. 1). As shown in FIG. 2, vehicle vision system 10 includes a reflective element 18, which reflects an image of the scene occurring exteriorly of the vehicle downward and toward an image capture device 20, which may be a camera, imaging array sensor or the like. Vehicle vision system 10 includes a non-circular aperture stop 24 positioned along an optic path, generally illustrated at 23, between reflective element 18 and image capture device 20. Non-circular aperture stop 24 defines a non-circular opening or aperture 24a (FIG. 4) which controls or limits the light reflected from reflective element 18 that is received by image capture device 20. As the image is received by image capture device 20, the image is electronically communicated to a display 22 positioned within vehicle 12, where the image may then be displayed to the vehicle operator or passenger.

In the illustrated embodiment, vehicle vision system 10 is a reverse or back up aid which is operable to provide an operator of the vehicle 12 with scenic information of an area rearward of the vehicle, shown generally at 13a and 13b in FIG. 1. Preferably, vehicle vision system 10 is configured to provide a broad field of view of the area immediately rearward of the vehicle, which may further include an area substantially directly downward to include a vehicle body reference, such as a rear portion 12a of a rear bumper 12b of vehicle 12 (FIG. 1) and upward to an upper level 14 just above the horizon 16 (FIG. 2).

As shown in FIG. 2, vehicle vision system 10 may be positioned along an exterior rear panel 26 of vehicle 12, such as a rear tailgate or the like. Reflective element 18 may be rigidly mounted to a protective housing or bracket 28 on rear panel 26, while aperture stop 24 and image capture device 20 are positioned within a detent area or recess 30 of rear panel 26. The image capture device 20 and aperture stop 24 may be positioned within recess 30 and encased therein by a transparent panel 27. Alternately, the system may be positioned in the detent area where the license plate is secured or may be included within the housing of a license plate lamp, or within a license plate frame or holder to ease an after market application of the system. In a minivan, sport utility vehicle or the like, the system may be positioned within or immediately adjacent to the rim molding of a rear window or backlight. The reflector may then be positioned on an exterior surface of the window with the image capture device being within the vehicle, so that the reflected image is directed through the window to the image capture device.

Alternately, a vehicle vision system in accordance with the present invention may be mounted within a rear spoiler of a vehicle. This location not only allows the reflector or camera lens to be directed more directly downward, beyond the rear of the vehicle, but also allows for simplified installation of the system as an aftermarket device. If is further envisioned that a vehicle vision system in accordance with the present invention may position an image capture system reflector or camera lens within a vehicle logo or badge on the rear panel of the vehicle. In such applications, when the reverse gear is engaged by the driver of the vehicle, a motorized drive may move the badge and the reflector or camera rearward to a position extending outwardly from the vehicle, in order to capture an exterior field of view from the vehicle. This orientation further protects the system when it is not in use and also allows the system to be moved substantially rearward or otherwise exteriorly when it is in use, so as to capture scenic information in a substantially downward direction.

It is further envisioned that a vehicle vision system in accordance with the present invention may be positioned elsewhere on the vehicle and directed so as to provide scenic information to the driver of other areas surrounding the vehicle, such as to one side or the other or both sides and/or the front of the vehicle. Additionally, a second vision system may be implemented, such that the two systems are directed substantially opposite to one another to receive discontinuous images via one or more image capture devices. Such an application provides the driver of the vehicle with scenic information of both sides of the vehicle simultaneously.

Reflective element 18 of vehicular vision system 10 may be a generally symmertrical or spherical reflector or may be an aspheric, asymmetrical reflector, such as the typed disclosed in commonly assigned copending U.S. Pat. application, Ser. No. 09/199,907, filed NO. 25, 1998 by Brent J. Bos et al. for WIDE ANGLE IMAGE CAPTURE SYSTEM FOR VEHICLE, the disclosure of which is hereby incorporated herein by reference. The curved reflector reflects and redirects an at least partially sistorted image toward image capture device 20. Because reflector 18 is non-symmetrical, the reflector affects and compromises the rotational symmetry of the image reflected by the reflector, such that the reflected image has a greater amount of distortion along one axis than the other, as discussed below. A similar result occurs when the image capture device is shifted off axis of other symmetrical or asymmetrical reflectors. Although shown and described as being applicable to a reflective vehicle vision system, aspects of the present invention are equally applicable to non-reflective, transmissive vision systems, such as a refractive vision system including a wide-angle refractive optic, such as of the type disclosed in commonly assigned copending U.S. Pat. application, Ser. No. 09/361,814, filed Jul. 27, 1999 by Brent J. Bos for WIDE ANGLE IMAGING SYSTEM, now U.S. Pat. No. 6,201,642, the disclosure of which is hereby incorporated herein by reference, or any other type of known refractive or transmissive imaging systems.

In the illustrated embodiment, reflective element 18 is a convex reflective element having a smooth, curved reflective surface 18a which provides a broad field of view of the scene immediately exteriorly of vehicle 12. The curved reflective surface 18a of reflective element or reflector 18 is preferably a metallized surface which may comprise chromium, aluminum, silver, stainless steel, titanium or alloys thereof or the like. The reflective surface 18a may be a first surface reflector or a second surface reflector. Because reflector 18 is positioned exteriorly of the vehicle, the reflector may be heatable to defog or defrost the reflective surface 18a. Reflector 18 may therefore be formed by a glass coated with an indium tin oxide transparent conductor or a doped tin oxide, or may include a wire mesh or a conductive coating mesh. Furthermore, the outer surface of the outer cover or of reflector 18 itself may be coated with an anti-soiling or anti-wetting coating, such as a silicone material, which may provide either a hydrophobic or hydrophilic property to the reflector.

Figure 3:
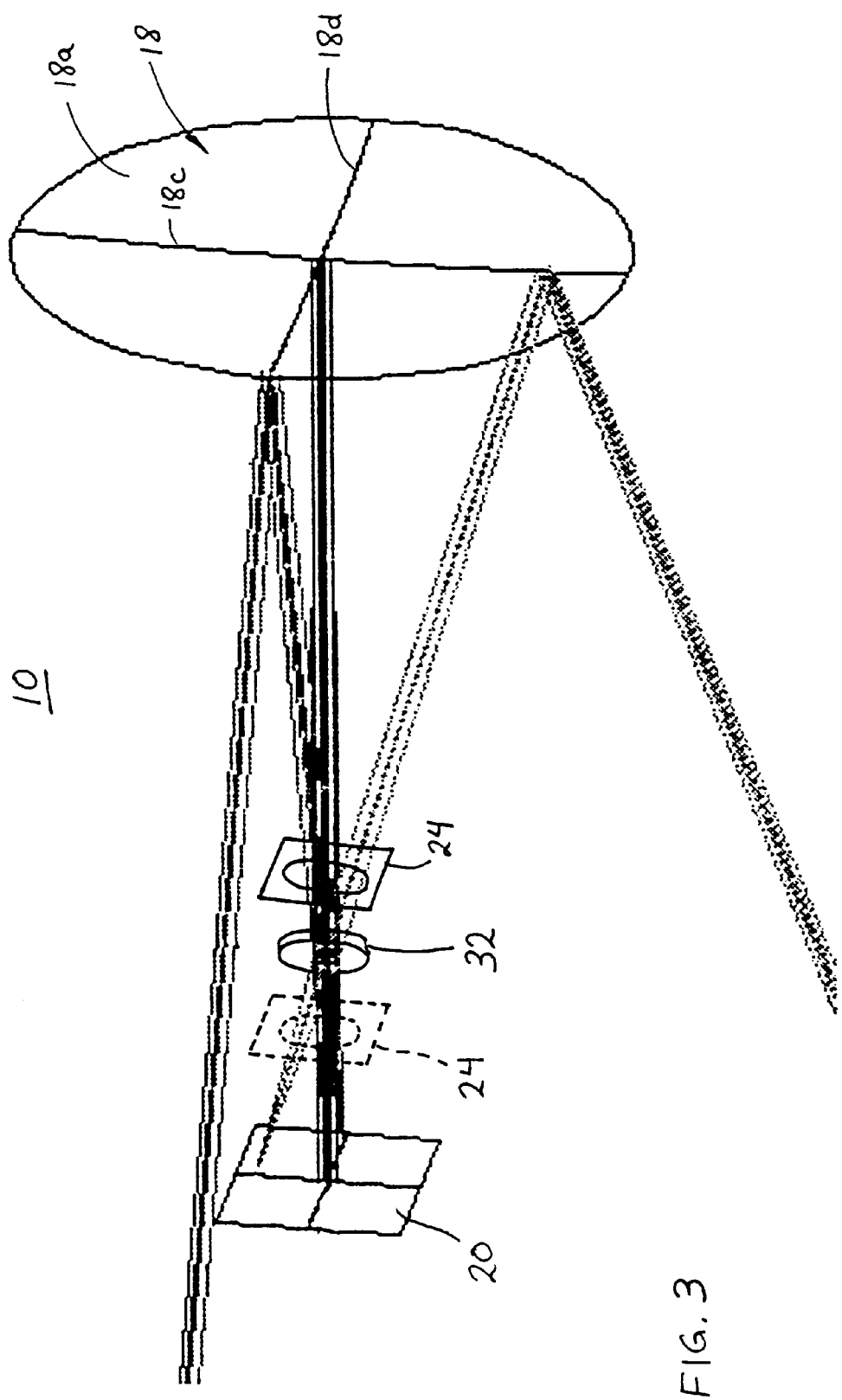
FIG. 3 is a perspective view of a vision system in accordance with the present invention.

As shown in FIG. 3, reflector 18 is an asymmetric convex reflector having a different radius of curvature between the horizontal and vertical directions. For example, as illustrated in FIG. 3, reflector 18 may be oriented to have a larger radius of curvature along a vertical axis 18c and a smaller radius of curvature along a horizontal axis 18d. Although shown in FIG. 3 as a generally horizontally oriented system, clearly the system may be rotated to a generally vertical orientation, similar to the illustrated embodiment of FIG. 2, or to any other orientation, without affecting the scope of the present invention. The smaller radius of curvature along axis 18d results in a greater amount distortion in the image reflected from the side portions of the reflector 18 then the amount of distortion in the image reflected from the upper or lower portions of reflector 18. The curved surface 18a of reflector 18 may also be a biconic surface defined by an equation including varying radii of curvature and two or more conic constants, which further affects the rotational symmetry of the system. Additionally, the image capture device and aperture stop may be rotated away from the central axis of the biconic reflector, which further compromises the rotational symmetry of the system.

As best seen in FIGS. 2 and 4, non-circular aperture stop 24 is positioned along the optic path 23 between reflector 18 and image capture device 20, and provides non-circular opening 24a through which the reflected image passes. In the illustrated embodiment of FIG. 4, non-circular circular opening 24a is an elliptical opening defined by a semi-major axis 25a and a semi-minor axis 25b. The length of the axes 25a, 25b is selected depending on the particular application of non-circular aperture stop 24. Preferably, in order to maintain at least the same amount of light entering the system as would be provided by a conventional circular aperture stop, the axes 25a and 25b may be selected such that the elliptical opening 24a has a same or substantially similar area as the conventional circular aperture stop. Because the area of a circular aperture is defined by the equation:

$A_{circle} = \pi r^2;$ where $A_{circle}$ is the area of the circular aperture and r is the radius of the circle, and the area of an ellipse is defined by the equation:

$A_{ellipse} = \pi ab;$ where $A_{ellipse}$ is the area of the ellipse, a is the length of semi-major axis 25a, and b is the length of semi-minor axis 25b, the axes of the ellipse may be selected to approximately equate the areas, given a radius for a circular aperture which allowed sufficient light to pass therethrough. Accordingly, in order to maintain substantially the same area and thus substantially the same amount of light entering into the system through non-circular aperture stop 24, the length of the axes 24a, 25b of elliptical aperture 24a should at least approximately satisfy the following relationship:

$ab = r^2;$ where the radius of the circular aperture was selected to allow sufficient light to enter the system for effective night time driving conditions. Providing an elliptical aperture in this manner allows the same amount of light into the system, yet increases overall image sharpness, as discussed below.

In general, the vision system should reflect or refract light towards the image capture device such that light representing a point in the scene falls on one point of the image capture device. However, due to the distortion produced by non-symmetrical reflectors or optic elements, the light being received by the image capture device is received over a larger area, commonly known as an image spot or blur spot. As shown in FIG. 5A, reflector 18 of FIG. 3, if implemented with a conventional circular aperture stop, would reflect light onto image capture device 20 as a blur spot 34 with significant aberration horizontally due to the smaller radius of curvature along the horizontal axis 18d of reflector 18, and less distortion vertically due to the larger radius of curvature along the vertical axis 18c of reflector 18. However, by implementing non-circular aperture stop 24 along the optic path between reflector 18 and image capture device 20, the light reflected by reflector 18 is received by image capture device 20 as a reduced size blur spot 36 (FIG. 5B). As shown in FIG. 5B, the blur spot 36 has a reduced width in the horizontal direction, yet experiences a minimal change in the vertical direction, where there is less distortion from reflector 18. This is accomplished by the smaller axis 25b of elliptical opening 24a of non-circular aperture stop 24 being oriented along a plane defined by the smaller radius of curvature along the horizontal axis 18d of reflector 18 (FIG. 3). The smaller opening in aperture stop 24 along the horizontal direction functions to reduce the aberration of the image being received by image capture device 20 in that direction. However, the larger semi-major axis 25a, which is oriented along a plane defined by the larger radius of curvature along the vertical axis 18c, functions to allow a greater amount of light to enter the system with a minimal affect on image sharpness in the vertical direction.

In the illustrated embodiment, the image sharpness is substantially improved by selecting axes 25a, 25b to improve image quality while maintaining the desired aperture area. Because there is better control of the aberrations in the vertical direction, increasing the size of semi-major axis 25a does not substantially increase the size of the blur spot in the vertical direction. However, reducing the semi-minor axis 25b results in a significantly reduced size of the blur spot in the horizontal direction, due to the large amount of aberration present in the horizontal direction.

The non-circular aperture stop 24 thus functions to block light which is highly aberrated from reaching the image capture device, while allowing light that is less aberrated to get through and make up for the light that was blocked. This results in a narrowing of the blur spot of the image being received by the image capture device along the highly aberrated axis, while only slightly increasing the other, less aberrated axis, such that the overall image spot or blur spot received by the image capture device is substantially sharper than the blur spot received via a circular aperture stop. Therefore, the overall effect of the non-circular aperture stop of the present invention is a slight increase in the blur spot in the vertical direction and a dramatic reduction in the blur spot in the horizontal direction, thereby substantially increasing the contrast or sharpness of the image being received by image capture device 20, while maintaining the same amount of light being received by image capture device 20. This provides a substantial improvement in the overall sharpness of the image being received by image capture device 20, and thus being displayed by display 22 in vehicle 12, while facilitating effective nighttime operation of the system.

Image capture device 20 is operable to receive the reflected image from reflector 18, whereby a signal of the image will be communicated to display 22 in vehicle 12. As shown in FIG. 2, image capture device 20 may be positioned relative to reflector 18 such that image capture device 20 is offset from the center axis 18b of the reflector 18, such that the image received by image capture device 20 does not include a reflection of the image capture device itself. Although various camera devices may be implemented, a pixelated imaging array is preferred for image capture device 20. An example of such an imaging array is a CMOS imaging array or the like, such as the type disclosed in commonly assigned U.S. Pat. No. 5,670,935, issued to Schofield et al., the disclosure of which is hereby incorporated herein by reference. However, other devices, such as a CCD or the like, may otherwise be used in vehicle vision system 10, without affecting the scope of the present invention. Image capture device 20 may be fixedly secured within the rear panel 12 or elsewhere on the vehicle, or may be movable, such as by a joystick or the like, to provide the driver with a different viewpoint if desired. Optionally, the image capture device may include a remotely operable zoom lens and/or variable focus or the like to adjust the view provided to the operator. Alternately, image capture device 20 may be fixed, while the ability to pan or zoom within the wide field of view captured by the image capture device 20 may be provided by electronic image processing of the image display to the driver. Image capture device 20 may also be connected to an image recording system to allow the driver to record the events occurring exteriorly of the vehicle. Optionally, image capture device 20 may also measure the contrast ratio of the exterior scene to determine when visibility conditions change around the vehicle. The vehicle vision system of the present invention may then provide a warning to the driver to slow down as visibility decreases. The warning may be provided in display 22 or elsewhere within vehicle 12 as a visual or audio communication. Because drivers tend to drive faster as the scenic information becomes less visible, as they lose references to ground movement and cannot readily discern how fast they are driving, such a warning system reduces the likelihood that the driver will increase the speed of the vehicle as conditions worsen.

Display 22 is positioned within vehicle 12 for easy viewing of the display by the operator of vehicle 12. Display 22 may be a liquid crystal display (LCD) or the like, and displays an image as received from image capture device 20. Preferably, display 22 displays the image at a focal length that is forward of the vehicle passenger compartment, such as disclosed in published PCT Application, Intl. Publication WO 96/38319, published Dec. 5, 1996, the disclosure of which is hereby incorporated herein by reference.

As shown in FIG. 2, vehicle vision system 10 may further include a corrective optic or lens element 32, which is positioned along the optic path between reflector 18 and image capture device 20. Corrective optic 32 may include a diffractive element and/or a refractive element, in order to focus, provide color correction and/or provide image distortion correction to the image reflected and redirected toward image capture device 20. For example, corrective optic 32 may comprise a plastic diffractor which is a low cost yet effective means to correct color aberrations in the reflective image. However, corrective optic 32 may also comprise a two element acromat or the like. Corrective optic 32 may comprise or further include an aspheric refractive element attached thereto to further correct for distortions and aberrations within the redirected image. The refractive lens element may be a single element glass lens or a transparent plastic lens element having a varying width, such that the image passing through the refractive element is refracted in varying degrees, corresponding to the magnitude of distortion in the image received by corrective optic 32. Therefore, corrective optic 32 may function as a means for further correcting distortions within the image. Although shown as being positioned between aperture stop 24 and image capture device 20, one or more corrective optics 32 may be positioned elsewhere along the optic path 23 between aperture stop 24 and image capture device 20 and/or between reflective element 18 and aperture stop 24, without affecting the scope of the present invention. The precise locations of aperture stop 24 and corrective optic or optics 32 may be selected depending on the particular application of the vision system.

Although shown as part of a reflective fision system, the non-circular aperture of the present invention may be implemented in reflective or transmissive vision systems, which may be applicable in various vehicle vision systems, such as in vehicle reverse or backup aids, such as the type disclosed in commonly assigned, copending U.S. Pat. applications, Ser. 09/199,907, filed Nov. 25, 1998 by Brent J. Bos et al for WIDE ANTLE IMAGE CAPTURE SYSTEM FOR VEHICLE, and/or Ser. NO. 09/361,814, filed Jul. 27, 1999 by Brent J. Bos for WIDE ANGLE IMAGING SYSTEM, now U.S. Pat. NO. 6,201,642, the disclosures of which are hereby incorporated herein by reference, headlamp dimmer controls, such as the type disclosed in U.S. Pat. NO. 5,796, 094, the disclosure of which is hereby incorporated herein by reference, or any other vehicle vision systems, such as, for example, the type disclosed in U.S. Pat. No. 5,670,935, the disclosure of which is hereby incorporated herein by reference.

It is further envisioned that the reflector of vehicle vision system 10 may comprise a curved reflective surface defined by polynomial terms. The image capture device and aperture stop may then be rotated off center or away from the axis of the reflector, such that the rotational symmetry of the system is further compromised. For example, the mirrored surface of the reflector may be described in a (x, y, z) coordinate system by the following equations:

$$r(x, y) = \sqrt{x^2 + y^2};$$

$$z(x, y) = \frac{c \cdot r^2}{1 + \sqrt{1 - (1+k) \cdot c^2 \cdot r^2}} + \sum_{i=1}^{N} A_i \cdot E_i(x, y);$$

where r is the radius of curvature of the reflector, x, y, and z are coordinates on the curved surface along the x, y and z axes, respectively, c is the curvature, k is the conic constant, $A_i$ is a constant, and $E_i$ is simple power series in terms of x and y. For an application with a reflector defined by the above equations, the performance of the system, if implemented with a circular aperture stop, is dominated by astigmatism and also exhibits some spherical and chromatic aberrations, for example, as shown as an image spot or blur spot 38 in FIG. 6A. Blur spot 38 is a generally tear drop shape due to the astigmatism and aberrations present in the reflected image of the vision system. Although an elliptical aperture as discussed above is beneficial with such a system, a more optimal shape may be implemented to correspond to the teardrop shape of some of the image spots resulting from such a system.

As shown in FIG. 6A, the spot diagram reveals that there is a greater amount of aberration in the vertical direction than in the horizontal direction, yet the amount of blur in the horizontal direction is not the same along the entire vertical profile of the blur spot, since there is a greater amount of blur in the bottom half of the image spot than in the top half. In such an application, a non-circular and non-elliptical aperture stop is especially beneficial with such a system. Such an aperture stop may be defined in various ways, in response to the astigmatism and aberrations and the shape of the image spot resulting from a system having a circular aperture. The selection process or equations for the aperture stop may vary depending on the particular reflector and amount of rotation of the image capture device off the center axis of the reflector. For example, a useful closed form solution for two sides of an aperture for a system with a curved reflector defined by the above polynomial equations may be described by the following equation;

$$x(y) = \frac{c1}{(|y - ycenter|)^a} \cdot \frac{1}{\left(\exp\left(\frac{c2}{|y - ycenter|}\right) + 1\right)};$$

where c1, c2 and a are constants that control the shape and extent of the aperture, and ycenter is a selected value which locates the center of the aperture along the optic path. The ycenter value may be close to zero or may be adjusted up or down depending on the application. With such an equation, the top and bottom boundaries of the aperture would be straight lines. Also, because only a positive x coordinate will result from this equation, negative x coordinates are found by multiplying the results with a negative sign. The size of the aperture is then controlled by the following equation:

$$Area = 2 \cdot \int_{Ymin}^{Ymax} x(y) dy;$$

where Ymax and Ymin define the upper and lower boundaries or extent of the aperture and are selected depending on the particular application. It is desired to maintain the area of the aperture approximately equal to the area of the circular aperture, so the that the same amount of light enters the system through the non-circular and non-elliptical aperture. Implementation of such an aperture stop provides enhanced image sharpness, as represented by the image spot or blur spot 39 of FIG. 6B. Other shapes of apertures or openings in various aperture stops may be calculated and implemented to accommodate various blur spot patterns for different applications of reflective or transmissive vision systems in a similar manner, without effecting the scope of the present invention.

It is further envisioned that the shape and orientation of the non-circular aperture stop of the present invention may be otherwise selected depending on the shape of the blur spot being received by the image capture device. For example, in certain applications, the non-circular aperture may be oriented relative to the curved reflective element and the image capture device such that a long aperture axis is aligned with a shorter radius of curvature of a curved reflective element. A corrective element or optic may then be provided along the optic path which corrects a greater amount of aberration in one direction, such as along the axis defined by the shorter radius of curvature, than in the other direction or directions. Accordingly, the longer axis of the aperture stop is then generally aligned with the direction of the blur spot that has the lesser amount of aberration, while the shorter axis of the aperture stop is aligned in the direction of the blur spot where the aberration is larger. These directions may or may not be orthogonal to each other, depending on the particular application. Such an orientation may be applicable, for example, where one or more other refractive, corrective elements or optics are added to the system.

Referring now to FIG. 7, an alternate embodiment of a vehicle vision system 110 in accordance with the present invention includes a reflector 18, an image capture device 20, a non-circular aperture stop 24 and a flat reflective element or mirror 40. Reflective element 18, image capture device 20 and non-circular aperture stop 24 of vehicle vision system 110 may be substantially identical to the corresponding components of vehicle vision system 10, discussed above, such that a detailed description of each will not be repeated herein. Similar to vision system 10, vehicle vision system 110 is mounted at an exterior panel 26 of vehicle 12, with reflector 18 being mounted at a housing 28 extending exteriorly from panel 26. Flat reflective element 40 functions to redirect the reflected image 29 upward into a recess 130 and toward image capture device 20. Transparent panel 27 is provided in panel 26 to allow the reflected image 29 to pass therethrough toward flat reflective element 40. Similar to vehicle vision system 10, discussed above, vehicle vision system 110 may further include a corrective optic 32 positioned along the optic path between flat reflective element 40 and image capture device 20. Also, although shown as being positioned between corrective optic 32 and image capture device 20, non-circular aperture stop 24 may otherwise be positioned along the optic path 41 between flat reflective element 40 and corrective optic 32,without affecting the scope of the present invention.

Additionally, a housing or baffles 42 may be provided to substantially encase image capture device 20,aperture stop 24 and corrective optic 32, in order to minimize any additional stray light from being received by or reflected within vehicle vision system 110. Baffles 42 reduce the amount of stray light, as represented generally by line 43 in FIG. 6, from entering recess 130 at an angle which is not toward flat reflective element 40, and thus from reflecting within corrective optic 32 and image capture device 20. Therefore, the primary light received by image capture device 20 is light constituting the desired exterior image reflected by reflector 18 via flat reflective element 40. Other light is shielded from image capture device 20 due to rear panel 26, baffles 42, and the orientation of flat reflective element 40, thereby greatly reducing the likelihood of glare within the captured image.

Because vehicle vision system 110 may be folded, whereby the reflected image is redirected upward into a recess of a vehicle panel, vehicle vision system 110 may be implemented in regions of a vehicle where there may not be enough space downward from the reflector to position the elements of the vision system. This provides for mounting of vehicle vision system 110 in areas which may not be suitable for vehicle vision system 10. In such a folded application as vehicle vision system 110, the amount of folding that can typically occur is limited by the aperture stop diameter. Because non-circular aperture stop 24 may be oriented to provide a smaller axis or dimension in the direction of the fold of the system, the vision system may be folded even further than previously allowable. The vision system 110 thus may be folded further and thus made more compact, while improving image sharpness and maintaining an appropriate amount of light entry for nighttime conditions.

Although shown and described above with respect to reflective vision systems which reflect an image of an exterior scene toward an image capture device, the non-circular aperture stop of the present invention may be equally applicable to transmissive systems where a wide-angle lens refracts an image of the exterior scene toward an image capture device. The non-circular aperture of the present invention is especially applicable to systems where the rotational symmetry of the image being reflected or refracted toward the image capture device has been compromised, either by a reflective element having different radii of curvature, a non-symmetrical lens or optic, and/or an off center or off axis positioning of the image capture device with respect to the reflector or lens. In such applications, the non-circular aperture stop provides an increasing contrast or sharpness of the image, while still allowing adequate or equal amount of light to pass to the image capture device, thereby enabling the system to be functional in low light or nighttime driving conditions.

Therefore, the present invention provides improvement to wide-angle camera or vision systems in compactness, image sharpness and low light performance. Image sharpness can be increased while maintaining the light throughput by reducing the diameter of the system in one direction and increasing it in the orthogonal direction. Modeling shows an improvement in image sharpness of 15% or more when using an elliptical aperture instead of a circular one—for the same amount of light throughput. The non-rotationally symmetric aperture improves the reflective, wide-angle camera system's image sharpness due to partial correction of the large amount of astigmatism in the system. The system's astigmatism arises from the non-symmetry of the system design (such as where an image capture device is tilted off the center of an aspheric mirror) and the preferred different fields of view in orthogonal directions.

The non-circular aperture of the present invention allows a more compact wide-angle vision system design because the system may be folded by the use of a flat mirror. The amount of folding that can occur is currently limited by the aperture stop diameter. However, by implementing an elliptical aperture stop that has a smaller dimension in the direction of the fold, the system can be folded even more to make the system more compact.

Although the use of an elliptical aperture is shown, the vehicle vision system may otherwise include a different, non-circular, non-elliptical and non-symmetric shape, which may be even more beneficial and may increase the image sharpness even more, without affecting the scope of the present invention.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property right or privilege is claimed are defined as follows:

1. A vision system for a vehicle comprising:
   an image capture device which is adapted to receive an image of a scene occurring exteriorly of the vehicle;
   a non-circular aperture stop positioned along an optical path between the scene and said image capture device, said non-circular aperture stop providing a non-circular aperture through which the image of the scene passes;
   a display system which displays an image from an output of said image capture device; and
   a reflective element adapted to be mounted on a portion of the vehicle for reflecting an image of the scene occurring exteriorly of the vehicle, said non-circular aperture stop being postioned along the optical path between said reflective element and said image capture device, wherein said reflective element has a first radius of curvature and a second radius of curvature, said first radius of curvature being different than said second radius of curvature.

2. A vision system for a vehicle comprising:
   an image capture device which is adapted to receive an image of a scene occurring exteriorly of the vehicle;
   a non-circular aperture stop postioned along an optical path between the scene and said image capture device, said non-circular aperture stop providing a non-circular aperture through which the image of the scene passes;
   a display system which displays an image from an output of said image capture device; and
   a reflective element adapted to be mounted on a portion of the vehicle for reflecting an image of the scene occurring exteriorly of the vehicle, said non-circular aperture stop being positioned along the optical path between said reflective element and said image capture device, wherein said reflective element reflects a non-rotationally symmetrical image toward said image capture device.

3. The vision system of claim 2, wherein said non-circular aperture comprises an elliptical aperture.

4. The vision system of claim 3, wherein said elliptical aperture has a first axis and a second axis, said first axis being larger than said second axis, said reflective element having a first radius of curvature and a second radius of curvature, said first radius of curvature being greater than said second radius of curvature, said first axis being generally aligned with a first plane defined by said first radius of curvature and said second axis being generally aligned with a second plane defined by said second radius of curvature.

5. The vision system of claim 4 further including a correcting optic positioned along the optical path between the scene and said image capture device.

6. The vision system of claim 5, wherein said correcting optic includes a diffractive element.

7. The vision system of claim 5, wherein said correcting optic includes a refractive element.

8. The vision system of claim 3, wherein said elliptical aperture has a first axis and a second axis, said first axis being larger than said second axis, said reflective element having a first radius of curvature and a second radius of curvature, said second radius of curvature being greater than said first radius of curvature, said first axis being generally aligned with a first plane defined by said first radius of curvature and said second axis being generally aligned with a second plane defined by said second radius of curvature.

9. The vision system of claim 8 further including a correcting optic positioned along the optical path between the scene and said image capture device.

10. The vision system of claim 9, wherein said correcting optic includes at least one of a diffractive element and a refractive element.

11. A vision system for a vehicle comprising:
an image capture device which is adapted to receive an image of a scene occurring exteriorly of the vehicle;
a non-circular aperture stop postioned along an optical path between the scene and said image capture device, said non-circular aperture stop providing a non-circular aperture through which the image of the scene passes;
a display system which displays an image from an output of said image capture device; and
a non-symmetrical reflective element positionable on a portion of the vehicle for reflecting an image for the scene occurring exteriorly of the vehicle toward said image capture device.

12. The vision system of claim 11, wherein said non-circular aperture stop is positioned between said non-symmetrical reflective element and said image capture device.

13. The vision system of claim 12, wherein said non-circular aperture is non-symmetrical.

14. The vision system of claim 13, wherein a shape of said non-symmetrical aperture is selected in response to a degree of astigmatism and aberrations in the reflected image.

15. The vision system of claim 14, wherein a reflective surface of said non-symmetrical reflective element is defined by one or more polynomial equations, said non-symmetrical aperture being defined in response to the shape of said reflective surface.

16. The vision system of claim 12 further including a correcting optic positioned along the optical path between said non-symmetrical reflective element and said image capture device.

17. The vision system of claim 12 further including a second reflective element positioned in an optic path from said non-symmetrical reflective element to said image capture device and adapted to redirect the reflected image toward said image capture device.

18. The vision system of claim 17, wherein said non-circular aperture stop is positioned along the optical path between said second reflective element and said image capture device.

19. The vision system of claim 18 further including a correcting optic positioned along the optical path between said second reflective element and said image capture device.

20. The vision system of claim 19, wherein said non-circular aperture stop is positioned between said correcting optic and said image capture device.

21. The vision system of claim 19, wherein said non-circular aperture stop is positioned between said correcting optic and the scene.

22. The vision system of claim 19, wherein said correcting optic includes at least one of a diffractive element and a refractive element.

23. A vision system for a vehicle comprising:
an image capture device which is adapted to receive an image of a scene occurring exteriorly of the vehicle;
a non-circular aperture stop positioned along an optical path between the scene and said image capture device, said non-circular aperture stop providing a non-circular aperture through which the image of the scene passes; and
a display system which displays an image from an output of said image capture device, wherein the image being received by said image capture device is received as at least one blur spot, said non-circular aperture being oriented with respect to said image capture device in response to a shape and orientation of the at least one blur spot being received by said image capture device.

24. The vision system of claim 23, wherein said non-circular aperture has a first axis and a second axis, said first axis being larger than said second axis, the at least one blur spot having a greater axis of aberration and a lesser axis of aberration, said non-circular aperture stop being oriented with respect to said image capture device to generally align at least one of said first and second axes with at least one of the greater and lesser axes of aberration of the at least one blur spot.

25. The vision system of claim 24, wherein said non-circular aperture stop is oriented with respect to said image capture device such that said first axis is generally aligned with the lesser axis of aberration of the at least one blur spot and said second axis is generally aligned with the greater axis of aberration of the at least one blur spot.

26. The vision system of claim 24, wherein said non-circular aperture stop is oriented with respect to said image capture device such that said first axis is generally aligned with the greater axis of aberration of the at least one blur spot and said second axis is generally aligned with the lesser axis of aberration of the at least one blur spot.

27. The vision system of claim 24, wherein said first and second axes are generally orthogonal to one another, the greater and lesser axes of aberration of the at least one blur spot being generally orthogonal to one another.

28. The vision system of claim 23 further comprising a reflective element adapted to be mounted on a portion of the vehicle for reflecting an image of the scene occurring exteriorly of the vehicle.

29. The vision system of claim 28, wherein said non-circular aperture stop is postioned along the optical path between said reflective element and said image capture device.

30. A vision system for a vehicle, comprising:
an image capture device which is adapted to receive an image of a scene occurring exteriorly of the vehicle;
a reflective element adapted to be mounted on a portion of the vehicle and configured to reflect a non-rotationally symmetrical image of the scene occurring exteriorly of the vehicle toward said image capture device;
a non-circular aperture stop positioned along an optical path between said reflective element and said image capture device, said non-circular aperture stop defining a non-circular aperture through which the reflected image passes; and
a display system which displays an image from an output of said image capture device.

31. The vision system of claim 30, wherein said non-circular aperture stop comprises an elliptical aperture stop defining an elliptical aperture having a first axis and a second axis, said first axis being larger than said second axis.

32. The vision system of claim 31, wherein said reflective element has a first radius of curvature defining a first plane and a second radius of curvature defining a second plane, said first radius of curvature being greater than said second radius of curvature.

33. The vision system of claim 32, wherein said first axis of said elliptical aperture is generally aligned with said first plane defined by said first radius of curvature and said second axis of said elliptical aperture is generally aligned with said second plane defined by said second radius of curvature.

34. The vision system of claim 33 further including a correcting optic positioned along the optical path between said reflective element and said image capture device.

35. The vision system of claim 34, wherein said correcting optic includes at least one of a diffractive element and a refractive element.

36. The vision system of claim 34 further including a second reflective element positioned in an optic path from said reflective element to said image capture device and adapted to redirect the reflected image toward said image capture device.

37. The vision system of claim 36, wherein said non-circular aperture is positioned along the optical path between said second reflective element and said image capture device.

38. The vision system of claim 32, wherein said first axis of said elliptical aperture is generally aligned with said second plane defined by said second radius of curvature and said second axis of said elliptical aperture is generally aligned with said first plane defined by said first radius of curvature.

39. The vision system of claim 38 further including a correcting optic positioned along the optical path between said reflective element and said image capture device.

40. The vision system of claim 39, wherein said correcting optic includes at least one of a diffractive element and a refractive element.

41. The vision system of claim 38 further including a second reflective element positioned in an optic path from said reflective element to said image capture device and adapted to redirect the reflected image toward said image capture device.

42. The vision system of claim 41, wherein said non-circular aperture is positioned along the optical path between said second reflective element and said image capture device.

43. The vision system of claim 30, wherein said reflective element comprises a non-rotationally symmetrical reflective element.

44. The vision system of claim 43, wherein said non-circular aperture stop comprises a non-symmetrical, non-circular aperture.

45. The vision system of claim 44, wherein a shape of said non-symmetrical, non-circular aperture is selected in response to a degree of astigmatism and aberration in the reflected image.

46. The vision system of claim 44, wherein a shape of said non-symmetrical, non-circular aperture is selected in response to at least one equation defining a surface of said non-rotationally symmetrical reflective element.

* * * * *

UNITED STATES PATENT AND TRADEMARK OFFICE
CERTIFICATE OF CORRECTION

PATENT NO. : 6,538,827 B2  Page 1 of 1
APPLICATION NO. : 09/799993
DATED : March 25, 2003
INVENTOR(S) : Brent J. Bos It is certified that error appears in the above-identified patent and that said Letters Patent is hereby corrected as shown below:

Column 4:
Line 51, "symmertrical" should be --symmetrical--.
Line 54, "No. 25," should be --Nov. 25,"--.
Line 58, "sistorted" should be --distorted--.

Column 5:
Line 55, Delete "circular" in the second occurrence.

Column 8:
Line 39, "fision" should be --vision--.
Line 46, "ANTLE" should be --ANGLE--.

Column 12:
Line 25, Claim 1, "postioned" should be --positioned--.
Line 35, Claim 2, "postioned" should be --positioned--.

Column 13:
Line 17, Claim 11, "postioned" should be --positioned--.
Line 24, Claim 11, "for" should be --of-- in the second occurrence.

Column 14:
Line 46, Claim 29, "postioned" should be --positioned--.

Signed and Sealed this

Twenty-fifth Day of December, 2007

JON W. DUDAS
*Director of the United States Patent and Trademark Office*